(12) United States Patent
Blanc et al.

(10) Patent No.: US 8,860,354 B2
(45) Date of Patent: Oct. 14, 2014

(54) CONTROL CIRCUIT FOR AN ELECTRIC MOTOR HAVING A POWER-SUPPLY CONTROL DEVICE

(75) Inventors: Didier Blanc, Crans-près-Céligny (CH); Ralph Coleman, Fleurier (GB); Jean-Marc Vaucher, Couvet (CH); Claude Froidevaux, La Chaux-de-Fonds (CH)

(73) Assignee: Etel S.A., Motiers, Swiss Confederation ( * ) Notice: Subject to any disclaimer, the term of this patent is extended or adjusted under 35 U.S.C. 154(b) by 0 days.

(21) Appl. No.: 13/818,230

(22) PCT Filed: Jul. 26, 2011

(86) PCT No.: PCT/EP2011/062806
§ 371 (c)(1),
(2), (4) Date: Apr. 4, 2013

(87) PCT Pub. No.: WO2012/028390
PCT Pub. Date: Mar. 8, 2012

(65) Prior Publication Data
US 2013/0181652 A1    Jul. 18, 2013

(30) Foreign Application Priority Data

Aug. 31, 2010   (CH) ..................................... 1418/10

(51) Int. Cl.
*G05B 11/00* (2006.01)
*H02P 25/06* (2006.01)

(52) U.S. Cl.
CPC ...................................... *H02P 25/06* (2013.01)
USPC ............................ 318/687; 323/282; 323/283

(58) Field of Classification Search
CPC ................. H02M 2001/0009; H02M 3/33523
USPC .................................. 318/687; 323/282, 283
See application file for complete search history.

(56) References Cited

U.S. PATENT DOCUMENTS

| 4,914,381 A | 4/1990 | Narod |
| 7,692,465 B2 | 4/2010 | Mottier |
| 2005/0156583 A1 | 7/2005 | Nachamiev et al. |

FOREIGN PATENT DOCUMENTS

JP    2007-202300    8/2007

OTHER PUBLICATIONS

Analog Devices: "AD7400 Isolated Sigma-Delta Modulator", Sep. 1, 2007.
M. Schulz, "A Progressive Way to Integrate Current Measurement into Modern Power Electronic Systems," PCIM Europe 2008, Jun. 6, 2008.
International Search Report, dated Jan. 28, 2013, issued in corresponding International Application No. PCT/EP2011/062806.

*Primary Examiner* — Erick Glass
(74) *Attorney, Agent, or Firm* — Kenyon & Kenyon LLP

(57) ABSTRACT

The control circuit of an electric motor, which has at least one phase supplied with high voltage and has a defined high-voltage zone, is provided with a control for the supply current of the phase with a setpoint-value current, and has devices for measuring the supply current which generate a first analog signal whose value corresponds to the measured current, an electronic control unit being disposed in a low-voltage zone, and having an analog-to-digital converter for converting the first analog signal or another analog signal acting as the first analog signal, into a corresponding digital signal which is supplied to the electronic control unit. The measuring devices are formed by a bleeder resistor, which is disposed in series with the phase, as well as by a differential amplifier whose two inputs, respectively, are connected to two contacts of the bleeder resistor. The analog-to-digital converter is located in the high-voltage zone a galvanic separating element is situated between the analog-to-digital converter and the electronic control unit. The control circuit has, inter alia, a voltage converter which, within the high-voltage zone, provides a floating low voltage which supplies the analog-to-digital converter.

10 Claims, 4 Drawing Sheets

US 8,860,354 B2

CONTROL CIRCUIT FOR AN ELECTRIC MOTOR HAVING A POWER-SUPPLY CONTROL DEVICE

FIELD OF THE INVENTION

The present invention relates to the special field of electric motors, especially linear motors, and in particular, those whose electric-motor control with a control device permits precise driving of the motor.

BACKGROUND INFORMATION

The electric motors which are used in machine tools and in various industrial installations are often controlled such that a predefined setpoint-value position is reached. In this context, a main control loop is implemented in the control of such electric motors in order to adjust an actual position of the moving part of the motor to a setpoint-value position. The difference in position is processed via an electronic control unit, which determines a setpoint value for the supply current. The supply of the motor is therefore designed to feed the motor (each of its phases) so as to generate a supply current that corresponds with the setpoint-value current. In order to ensure the precision of the intended movement, it is advisable to make sure that the actual current agrees with the setpoint current. This is accomplished via a measurement of the current at each supply phase (in order to clarify the presentation hereof, hereinafter only one phase is taken into account), and with a second control loop which adjusts the measured supply current to the setpoint current.

A schematic view of a conventional motor control is shown in FIG. 1. A phase 2 (R, L) is energized via a power amplifier 4, which itself is supplied via high voltage HV (for example, 300 volts). At its input, electronic control unit 6 receives a position signal $S_P$ with respect to the position control and a measuring signal $I_M^*$ of the electric current in phase 2. If the electronic unit is in a low-voltage zone (zone LV) and phase 2 is in a high-voltage zone (zone HV), in the normal case, the current is measured via a sensor of the magnetic type which has a ferrite ring 8, that is disposed around a conductor, which forms phase 2, as well as via an electronic circuit 10 for processing the electrical signal which is generated by the element for detecting the magnetic flux present in the ferrite ring. Such a measuring device is isolated galvanically from the phase. Electronic circuit 10 is supplied by the low voltage and is located in zone LV. An element for the galvanic isolation, which is suitable for transmitting an analog signal, is not necessary. It is noteworthy that such an element is relatively complex, and that high transmission precision of an analog signal via a galvanic isolation can only be achieved with difficulty. For this reason, to measure the current, one may select a Hall sensor or a sensor of the "fluxgate" type, as described, for example, in U.S. Pat. No. 4,914,381. However, such magnetic sensors are especially sensitive with regard to ambient magnetic fields which produce errors in the measurement. The signal-to-noise ratio is disadvantageous with such magnetic sensors to the extent that the precision of the current measurement in the phase is thereby impaired.

Electronic circuit 10 of the sensor generates an analog measuring signal $I_M$, which is converted into a digital signal $I_M^*$ by an analog-to-digital converter 12 likewise situated in the low-voltage zone. Based on this measuring signal, electronic circuit 6 determines the value of control signal $S_C^*$, which preferably is generated by a digital-to-analog converter 14 located in zone LV, and subsequently with the aid of a galvanic separating device which is designed to transmit the analog signals and to establish a galvanic separation GS. Equivalent analog signal $S_C$ is amplified by power amplifier 4. As mentioned above, galvanic separating device 16 is relatively complex, and the precision of the transmission of analog signal $S_C$ via the device is not particularly high. An alternative solution envisaged is to apply to the power amplifier, a signal that is modulated via the pulse width and is generated directly by the galvanic separating device by keying and blanking. This presents a further problem concerning the precision of the control signal, such that the transmission of the modulated signal produces a parasitic signal which must be filtered in analog fashion at the input of the power amplifier. This filtering is simplified by the selection of an increased frequency for the transmission of the signal, but is to the detriment of the resolution of the modulation of the pulse width, which becomes inadequate in so far as explained in the introduction to the U.S. Pat. No. 7,692,465. In addition, the filtering may be reflected in phase 2 itself, if a power amplifier is used in the switching mode; however, this option is not compatible with the demands with regard to precision placed on the present practical application.

The control of the electric motor explained above raises precision problems, first of all, in measuring signal $I_M^*$ generated by electronic control unit 6, and subsequently in control signal $S_C$ generated by the electrical supply of the motor.

SUMMARY

Example embodiment of the present invention provide an efficient and precise control circuit, and in doing so, limit manufacturing costs, especially by avoiding the placement of complex and expensive elements in the control circuit.

Example embodiments of the present invention provide a control circuit for an electric motor which has at least one phase, the control circuit generating, via a first digital-to-analog converter, a control signal for the electric high-voltage supply of the phase, and a control of the supply current of the phase based on a setpoint current, the electric supply determining a high-voltage zone (zone HV) of the electric motor. The control circuit includes:

- a device for measuring the supply current which provides an analog signal whose value corresponds with the setpoint current;
- an electronic control unit which is disposed in a low-voltage zone (zone LV);
- an analog-to-digital converter to convert the analog signal or another analog signal acting as the analog signal, into a corresponding digital signal which is made available to the electronic control unit.

The control circuit includes a bleeder resistor, also known as "shunt resistor," which is disposed in series with the phase, and by a differential amplifier whose two inputs, respectively, are connected to two contacts of the bleeder resistor. The analog-to-digital converter is located in the high-voltage zone and a galvanic separating element is disposed between the analog-to-digital converter and the electronic control unit. The control circuit has, inter alia, a DC/DC-voltage converter that within the high-voltage zone, makes a floating low voltage available which, in particular, supplies the analog-to-digital converter.

The voltage converter may be supplied by the low voltage of the low-voltage zone and may have a galvanic isolation.

Due to the characteristics of the control circuit, selected measuring devices make it possible to obtain a very precise measurement of the supply current in the phase considered. For reasons of the galvanic isolation, this selection is generally disregarded. Therefore, the system described herein responds in a meaningful manner to the specific problem, by providing a galvanic separating element (especially an optocoupler) between the device for measuring the current of the phase and the electronic control unit. In order, first of all, to ensure high precision in the signal transmission via the optocoupler, and then to lower the costs of the element, it is provided to dispose the galvanic separating element downstream of the analog-to-digital converter such that a digital signal is transmitted via it. A simple optocoupler allows precise transmission of a digital signal, which is not the case for an analog signal. In addition, a floating low voltage is provided in the high-voltage zone in order, in particular, to supply the analog-to-digital converter.

It may be provided, inter alia, to dispose an analog subtractor in the high-voltage zone, and to apply a first analog signal which corresponds to the measured current, and a second analog signal which corresponds to the setpoint current, to the input. At its output, the analog subtractor provides a third analog signal which is proportional to the difference between the first and the second analog signal, and therefore acts as the difference between the supply current and the setpoint current. The third analog signal is made available to the electronic control unit via the analog-to-digital converter and via the second galvanic separating element, and downstream of the analog-to-digital converter, forms the corresponding digital signal.

Accordingly, the analog-to-digital converter receives a measuring signal that corresponds to the difference between the measured current and the setpoint value, that is, a signal whose value lies below that of the measured current. One is thus able to obtain high precision in the conversion of the measured analog signal into digital form for the electronic control unit with a more favorable converter with "10 or 12 bit" or with "16 bit" for a very high resolution. In addition, the analog subtractor may be disposed in the high-voltage zone in order to obtain the advantages of the analog-to-digital converter being upstream of the galvanic separating element. One has therefore taken the subtractor, usually provided in the electronic control unit, out of the low-voltage zone and replaced it by an analog subtractor in the high-voltage zone and supplied it with the floating low voltage made available in this high-voltage zone. This configuration still requires the provision of the setpoint value for the supply voltage, which is generated by the electronic unit in the low-voltage zone as opposed to the high voltage, and to convert that digital signal into a purely analog setpoint value in order to make it available to the analog subtractor. By again disposing a galvanic isolating element between the electronic unit and a digital-to-analog converter, one obtains high precision for the analog setpoint value and the configuration of the relatively simple and advantageous elements. Even though this configuration may appear complex due to the necessity of a multitude of specific elements, especially due to the addition of a galvanic separating element and a digital-to-analog converter, it guarantees very precise regulation of the current and actually a very effective control of the electric motor without the necessity of a complex or costly element.

DETAILED DESCRIPTION

Figure 1:
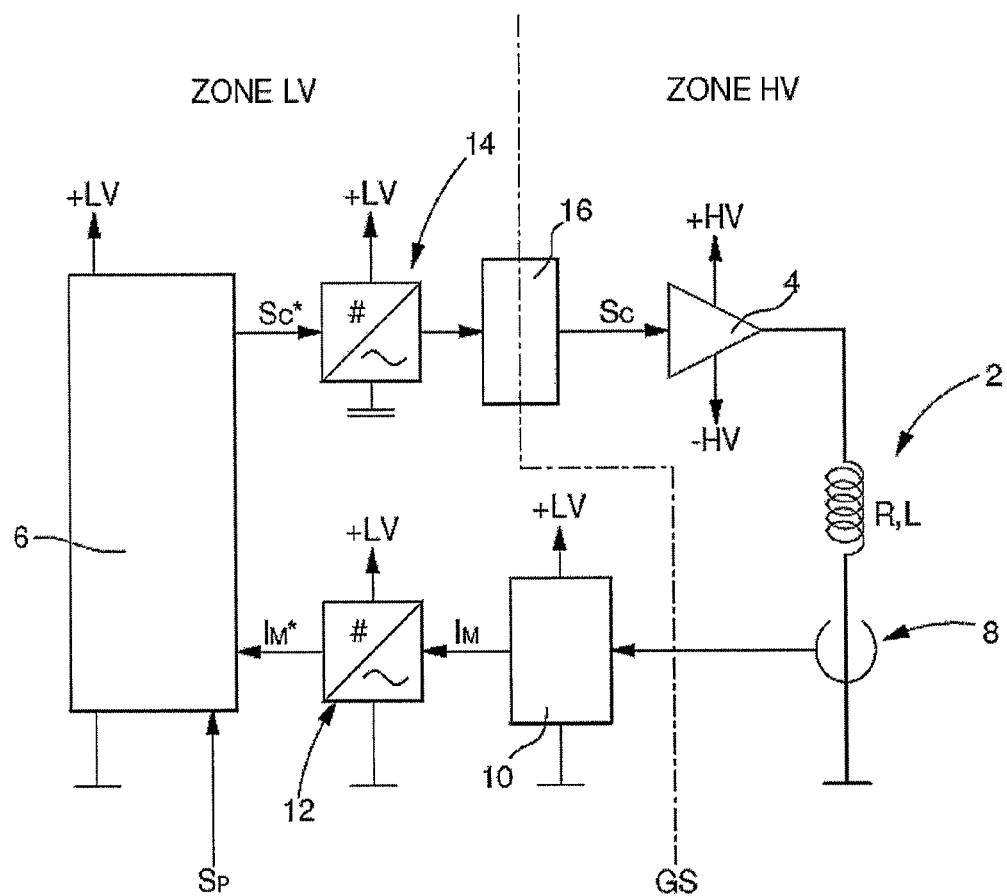
FIG. 1 shows a conventional control circuit for an electric motor.
Figure 2:
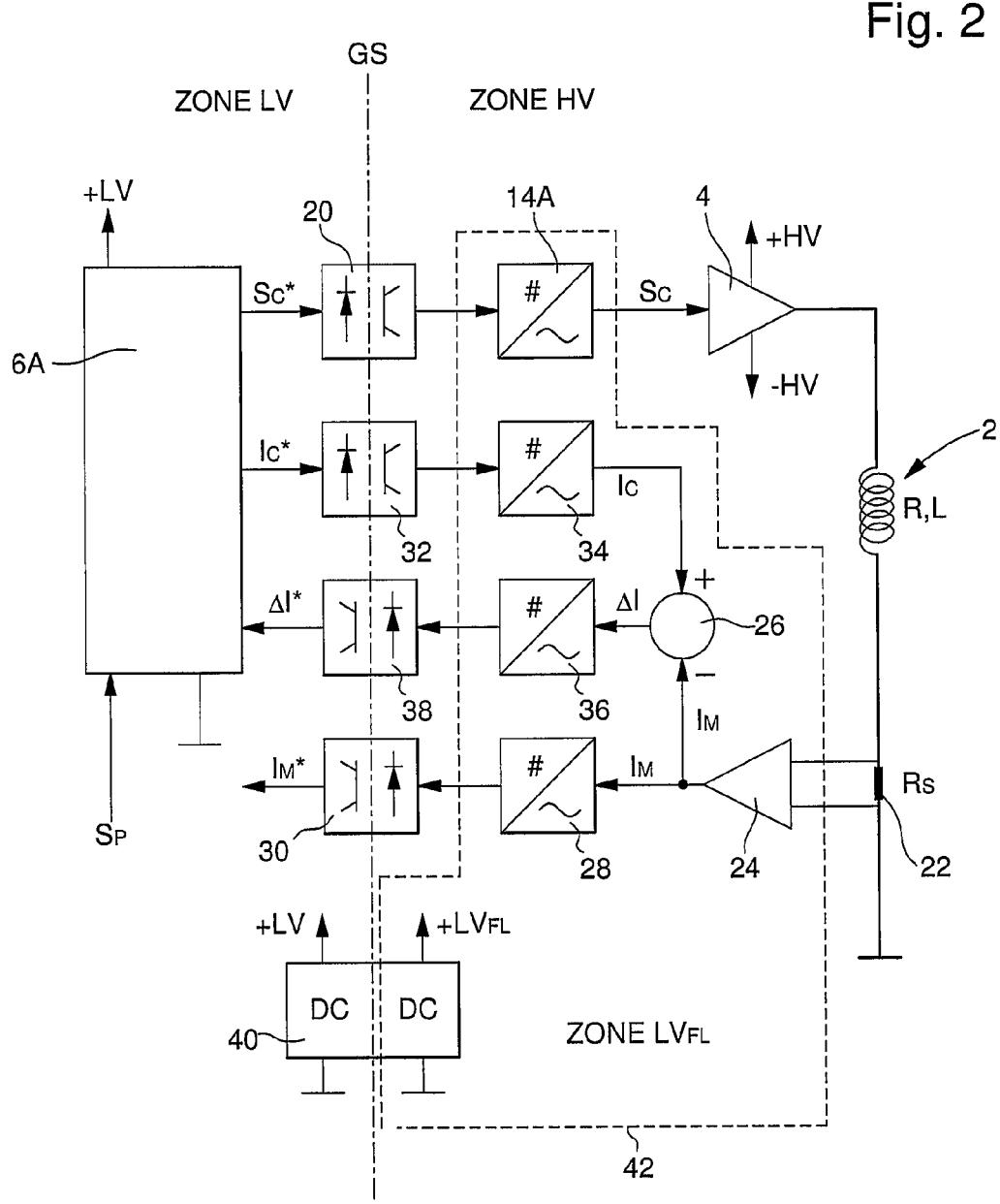
FIG. 2 schematically illustrates a control circuit according to an example embodiment of the present invention.

FIG. 2 schematically illustrates a control circuit of an electric motor according to an example embodiment of the present invention. The motor is represented by its phase 2. The supplies of the high voltage +HV, −HV are provided in a conventional manner and are formed by a power amplifier 4, for example. The power amplifier may be operated in linear mode or in switchover mode. However, in view of the high demands on the precision of the present practical application, a linear operation is preferred. Electronic control unit 6A is supplied with low voltage and is located in a low-voltage zone, "zone LV," galvanically isolated from the high-voltage zone, "zone HV," where phase 2 and its supply 4 are located, as required by prevailing safety standards for high voltages above a predefined limit, e.g., 48 volts.

Electronic control unit 6A provides a digital control signal $S_C^*$ which, according to example embodiments, is initially made available to a galvanic separating element 20, in order to ensure good precision in the transmission of the control signal. After that, the digital signal is fed to a digital-to-analog converter 14A which is situated in zone HV, and analog control signal $S_C$ is ultimately supplied to power amplifier 4.

According to example embodiments of the present invention, the device for measuring the supply current of the phase, which is specified to control a supply current according to a setpoint-value current predefined by the electronic control unit, is formed by a bleeder resistor $R_s$ which is disposed in series with phase 2, and by a differential amplifier 24 whose two inputs are connected to two contacts of the bleeder resistor. At its output, differential amplifier 24 provides an analog measuring signal of the supply current of phase 2; analog measuring signal $I_M$ is supplied, on one hand, to an analog subtractor 26, and on the other hand, to an analog-to-digital converter 28 which transmits the signal to zone LV via an optocoupler 30 that defines a galvanic separating element. In this manner, a digital signal $I_M^*$ is obtained which corresponds to the value of the measured supply current. This signal may be used for various functions, especially for the safety and the thermal protection of the motor. However, as illustrated in FIG. 2, digital signal $I_M^*$ is not used in the control loop of the supply current. Consequently, it is not necessary that the digital signal provide high precision, and therefore a more cost-effective converter 28 having a standard resolution may be provided, which covers the entire range of the current permissible in the phase.

Electronic unit 6A provides a setpoint value $I_C^*$ (digital signal) for the supply current. The digital setpoint value initially goes through a galvanic separating element 32 and is subsequently supplied to a digital-to-analog converter 34 which is situated in zone HV. At the output of converter 34, a corresponding analog signal $I_C$ is therefore obtained, which is supplied to analog subtractor 26 disposed in zone HV. The analog subtractor determines the difference between signals $I_M$ and $I_C$ and provides an analog signal $\Delta I$ which is proportional to the difference. This analog signal, which is used to control the supply current, is first of all fed to an analog-to-digital converter 36 located in zone HV. Downstream of converter 36, an equivalent digital signal $\Delta I^*$ is obtained which corresponds to analog signal $\Delta I$. It is noteworthy that the analog signal is a function of measured signal $I_M$, but in terms of actual amount, it has a value many times less than the last-named, usually by several orders of magnitude less than the value of measured signal $I_M$. This is very advantageous, since in this manner, the differential signal of the current ΔI may be converted via the analog-to-digital converter with very good resolution, without complex and costly converters being necessary for that purpose. A "12 bit" converter already permits a very good resolution for signal ΔI, however, the range is quite limited. A "16 bit" converter ensures very high resolution in this conversion, in order to supply a very precise digital signal to electronic unit 6A. According to example embodiments of the present invention, a galvanic separating element 38 is disposed downstream of converter 36 such that element 38, particularly an optocoupler, receives digital signal ΔI*. It is easy to transmit a digital signal with precision via an optocoupler, whereas the transmission of an analog signal is much more difficult and complex, in order to ensure high precision in the transmission of the signal from zone HV to zone LV.

According to example embodiments of the present invention, among other things, the control circuit has a DC/DC-voltage converter 40 which generates a floating low voltage $LV_{FL}$ in the high-voltage zone (zone HV) in order, in particular, to supply analog-to-digital converter 36. In this manner, the supply of converter 36 is coupled to the high voltage and decoupled from the low voltage, in order to break away from the common mode of phase 2 in relation to low-voltage zone LV. Voltage converter 40 is preferably supplied via the low voltage LV, and therefore has an internal galvanic separation.

According to example embodiments of the present invention, a floating low-voltage zone (Zone $LV_{FL}$) is provided in zone HV in order to supply converter 36 and, e.g., differential amplifier 24. Accordingly, one is freed from the common mode of the measured phase and avoids the interferences, associated with a common mode, in the differential measurement.

According to further configurations, which are included in the electric circuit diagram in FIG. 2, subtractor 26 and converters 14A, 28 and 34 are supplied via floating low voltage $LV_{FL}$.

It should further be mentioned that the ensemble of optocoupler elements 20, 30, 32 and 38, a galvanic separation GS, between zone LV in which electronic unit 6A is located, and zone HV in which phase 2 and supply device 4 are located, is provided in the digital part of the control circuit, that is, between electronic unit 6A, where a further digital circuit of zone LV is located, and converters 14A, 28, 34 and 36, which therefore are disposed in zone HV. Accordingly, this galvanic separation GS is implemented by a purely digital interface, which allows very high precision in transmitting the digital signals through the interface, as explained above. The converters are elements with a low-voltage supply, and according to example embodiments of the present invention, it is provided to supply them with a floating low voltage $LV_{FL}$ (for example, between 5 V and 10 V), which is made available via DC/DC-transformer 40 that preferably is supplied via the low voltage LV (for example, between 12 and 24 volts).

Figure 3:
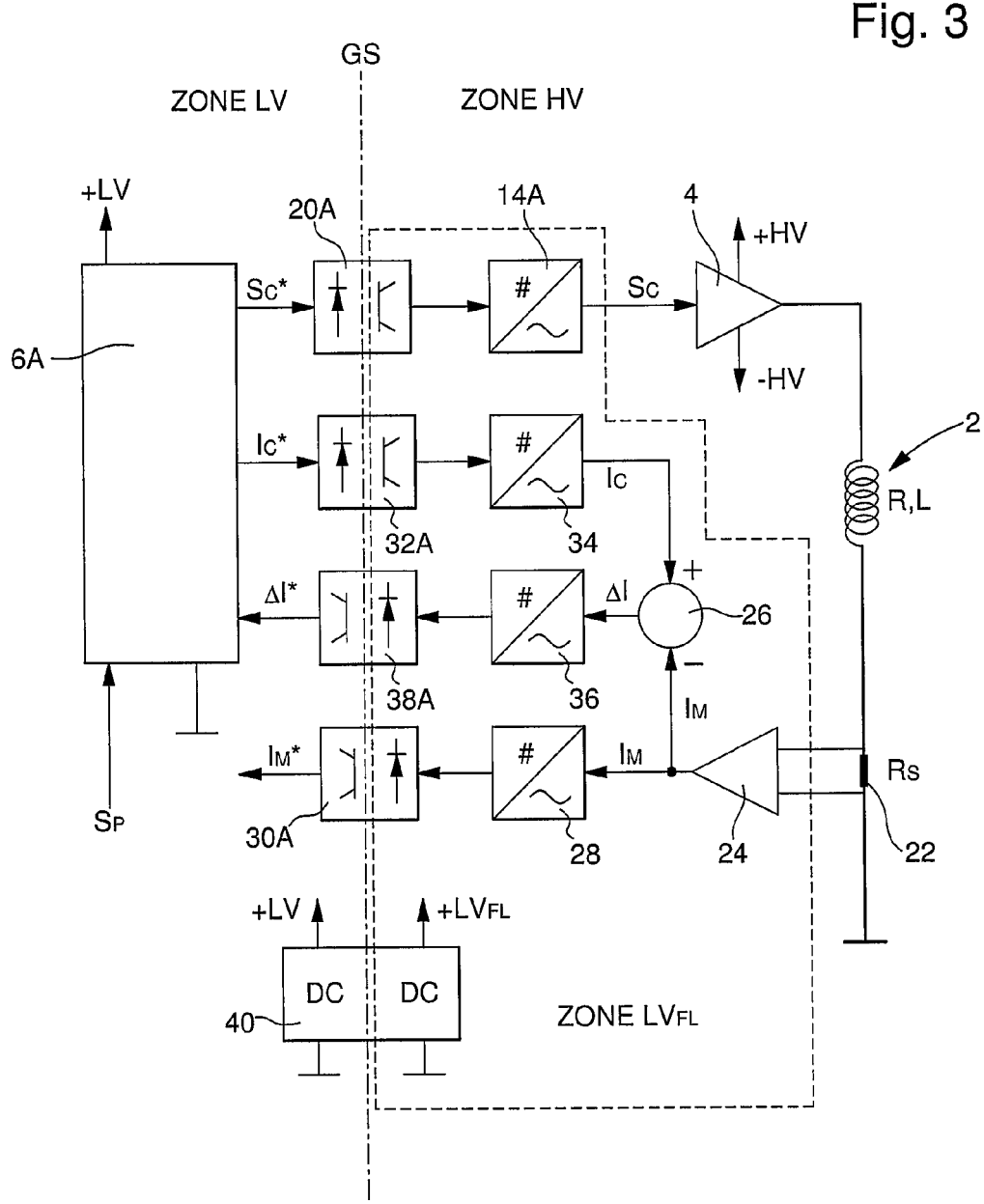
FIG. 3 schematically illustrates a variation of the control unit illustrated in FIG. 2.

FIG. 3 shows a variant of the control circuit according to FIG. 2. The elements already described are not explained again. This variant is distinguished by the subsequently described mode, in that galvanic separating elements 20A, 30A, 32A and 38A are elements supplied with current in order to permit a transmission at a far higher frequency of the digital signals. These elements are supplied, on one hand, via the low voltage LV, and on the other hand, via the floating low voltage $LV_{FL}$. Consequently, a high-performance motor control is obtained. This variant permits the use of magnetic elements for the galvanic separation instead of opto-electronic elements.

Figure 4:
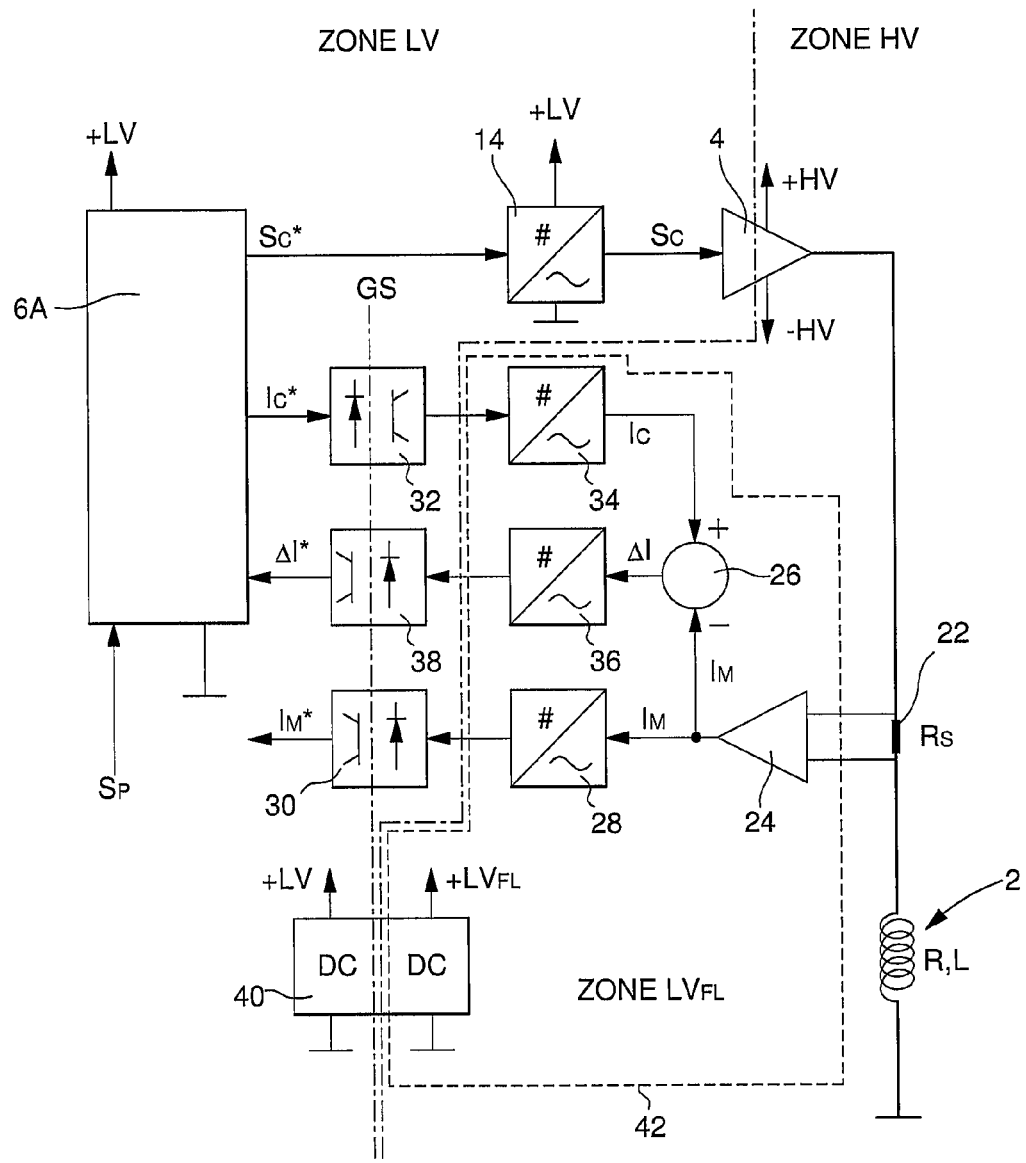
FIG. 4 schematically illustrates a control circuit according to an example embodiment of the present invention.

FIG. 4 illustrates a control circuit according to an example embodiment of the present invention. The reference numerals already described before are not explained again here. If the high voltage of "zone HV" is less than a threshold value (typically 48 volts) defined by prevailing safety standards, one may dispense with a galvanic separation between power amplifier 4 and electronic unit 6A, and feed control signal $S_C^*$ directly to digital-to-analog converter 14. Converter 14 is therefore supplied with the low voltage LV. The configuration of the other elements of the control circuit is similar to the example embodiment described above. This example embodiment implies that a galvanic separation between zones LV and HV is omitted, and that the corresponding masses are therefore electrically connected. Nevertheless, a benefit is derived in that the advantages mentioned above (especially the avoidance of interferences, caused by the common mode, during a differential measurement) are retained. For example, a galvanic barrier GS is retained, especially between converters 34 and 36 on one hand and electronic unit 6A on the other hand, such that a decoupling is retained between low-voltage zone LV and the zone of the floating low voltage $LV_{FL}$, the latter zone being located in the high-voltage zone and being coupled there to the high voltage HV, which varies sharply. One is therefore freed from the common mode of the phase.

What is claimed is:

1. A control circuit of an electric motor that has at least one phase, the control circuit adapted to generate, by a first digital-to-analog converter, a control signal for an electric high-voltage supply device of the phase, and to control a supply current of the phase based on a setpoint current, the electric supply device determining a high-voltage zone of the electric motor, comprising:
   a supply current measurement device adapted to provide a first analog signal having a value that corresponds with the setpoint current;
   an electronic control unit disposed in a low-voltage zone;
   an analog-to-digital converter, located in the high-voltage zone, adapted to convert the analog signal, or another analog signal that acts as the analog signal, into a corresponding digital signal that is made available to the electronic control unit; and
   a galvanic separation device arranged between the analog-to-digital converter and the electronic control unit;
   wherein the supply current measurement device includes a bleeder resistor arranged in series with the phase and a differential amplifier having inputs connected to contacts of the bleeder resistor; and
   wherein the control circuit includes a voltage converter adapted to provide, within the high-voltage zone, a floating low voltage to supply the analog-to-digital converter.

2. The control circuit according to claim 1, wherein the voltage converter is supplied with low voltage of the low-voltage zone and has a galvanic isolation.

3. The control circuit according to claim 1, wherein the voltage converter is adapted to supply the differential amplifier.

4. The control circuit according to claim 1, wherein the first digital-to-analog converter is upstream of a second galvanic isolation device, and the voltage converter is adapted to supply the first digital-to-analog converter.

5. The control circuit according to claim 1, further comprising an analog subtractor, arranged in the high-voltage zone, having an input adapted to receive the first analog signal that corresponds to a measured current, and to receive a second analog signal that corresponds to the setpoint current, the analog subtractor adapted to provide, at an output, a third analog signal that is proportional to a difference between the first analog signal and the second analog signal and therefore acts as a difference between a supply current and the setpoint current, the analog subtractor adapted to supply the third analog signal to the electronic control unit via the analog-to-digital converter and the first galvanic separation device, a corresponding digital signal being formed downstream of the analog-to-digital converter.

6. The control circuit according to claim 5, further comprising a third galvanic separation device followed by a second digital-to-analog converter, arranged in the high-voltage zone and is adapted to be supplied via the floating low voltage of the electronic control unit.

7. The control circuit according to claim 5, wherein the analog subtractor is adapted to be supplied via the floating low voltage.

8. The control circuit according to claim 6, wherein the third galvanic separation device is adapted to be supplied via the low voltage and via the floating low voltage.

9. The control circuit according to claim 1, wherein the second galvanic separation device is supplied via the low voltage and via the floating low voltage.

10. The control circuit according to claim 1, wherein the first galvanic separation device is supplied via the low voltage and via the floating low voltage.

* * * * *